No. 662,649. Patented Nov. 27, 1900.
A. S. KROTZ.
RUBBER TIRE SETTER.
(Application filed Feb. 26, 1900.)
(No Model.)
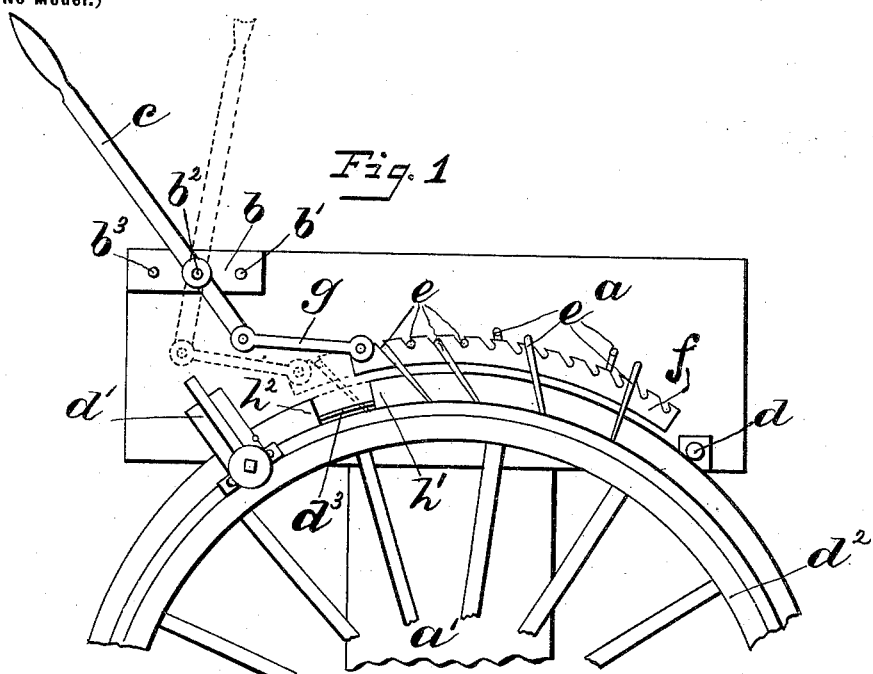
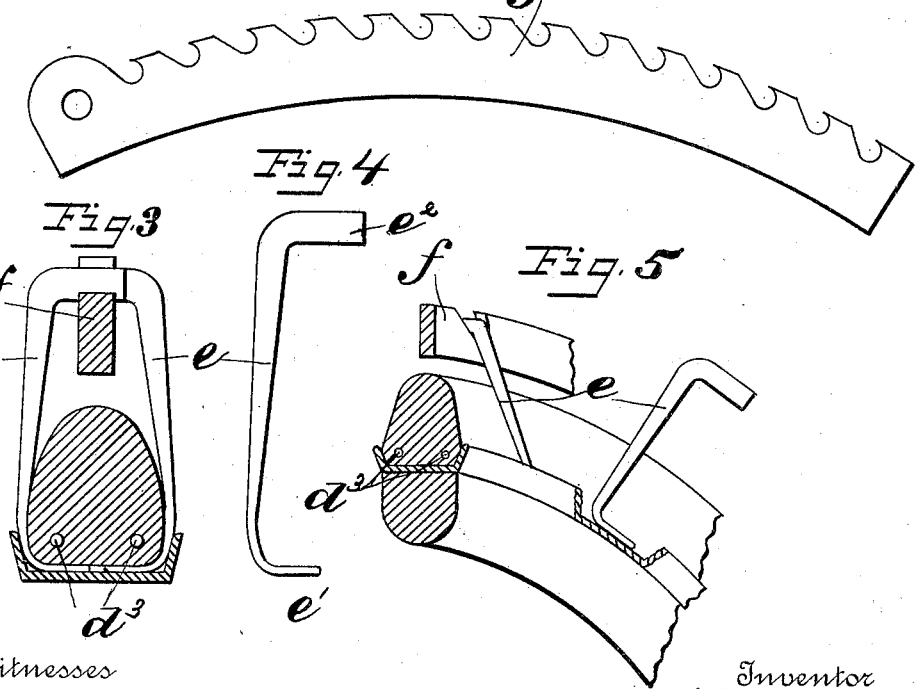
Witnesses
F. L. Walker
Chas. I. Welch
Inventor
Alvaro S. Krotz
By his Attorney
Paul A. Staley

UNITED STATES PATENT OFFICE.

ALVARO S. KROTZ, OF SPRINGFIELD, OHIO, ASSIGNOR TO THE CONSOLIDATED RUBBER TIRE COMPANY, OF NEW YORK, N. Y.

RUBBER-TIRE SETTER.

SPECIFICATION forming part of Letters Patent No. 662,649, dated November 27, 1900.

Application filed February 26, 1900. Serial No. 6,435. (No model.)

*To all whom it may concern:*

Be it known that I, ALVARO S. KROTZ, a citizen of the United States, residing at Springfield, in the county of Clark and State of Ohio, have invented certain new and useful Improvements in Devices for Equipping Vehicle-Wheels with Rubber Tires, of which the following is a specification.

My invention relates to improvements in devices for use in applying rubber tires to vehicle-wheels; and it consists of a device for closing the space between the ends of the rubber after the ends of the retaining-bands have been fastened.

In the drawings, Figure 1 is a plan view of my device, together with a portion of the rubber-tired wheel. Fig. 2 is a detail view of pulling-bar. Fig. 3 is a sectional view of the rubber tire and pulling-bar. Fig. 4 is a view of the device for gripping the rubber. Fig. 5 is a perspective view of a portion of the pulling-bar and of the rubber-tired wheel, with one of the gripping devices in a position for pulling and another in position for removing, a portion of the channel-iron being broken away.

Like parts are represented by similar letters of reference in the several views.

In the form of rubber tire largely in use for vehicles there are employed as retaining devices bands of metal, which pass through the rubber, and it is desirable in applying the rubber to the wheel to place the rubber, with the bands extending through them, within the channel-iron of the rim of the wheel before fastening together the ends of the retaining-bands. A space is necessarily formed at the point where the bands are to be fastened for the purpose of having ready access to the wires, and though the rubber is compressed before being placed within the channel the friction between the rubber and channel is such that it is necessary to provide means for closing the space formed at said joint, and in the device described herein I have provided means for closing this space.

In Fig. 1, $a$ represents a bed or table, upon which I mount the block $b$, with pins $b'$, $b^2$, and $b^3$ projecting from its upper surface, any one of which may serve as a fulcrum for the lever $c$, which is formed to fit over any one of said pins. There is also mounted on this bed or table a block with a stop-pin $d$, against which the wheel $d^2$ rests, and $d'$ is a clamp for clamping said wheel in position. $a'$ represents a table, upon which said wheel is supported. A link $g$ connects the bottom of said lever $c$ with one end of a notched pulling-bar $f$. Before the retaining-bands $d^3$ are fastened U-shaped hooks $e$ $e$ are placed under the tire, as shown in Figs. 1 and 3, one hook being placed back of the other. The extension $e'$ of each U-shaped hook is placed under the tire, said extension engaging the bottom of said rubber tire, while the upper projection $e^2$ engages with one of the notches of said bar. It can readily be seen that by moving the upper extension of the clamp out of engagement with the notched bar the hook can be easily turned, so that it can be removed from the rubber, as shown in Fig. 5. When the lever $c$ is operated, the notched bar $f$ is pulled along until the bar, link, and lever assume the position shown in dotted lines, Fig. 1, and for convenience the lever $c$ may be shifted to any pin on the block $b$, which will permit a greater or less movement of said bar.

In order that the pulling or stretching of the rubber tire may be uniform, the pair of clamps $e$ nearest the end $h'$ of the rubber are first engaged with the notched bar $f$, and after a slight movement of that end of the rubber tire has been made a second pair of clamps are put into engagement with the bar, and after further progress the third and each successive pair are made to engage with the notched bar $f$. After the ends $h'$ and $h^2$ are drawn together the U-shaped clamps are easily removed by turning each hook until the extension $e'$ is parallel with the sides of the channel of the tire. I have thus shown means by which the rubber will be drawn back against the friction of the rubber and channel to a position which it will maintain owing to the pressure of the rubber, and it is readily seen that the pairs of U-shaped hooks act as a set of clamps, clamping the rubber at the bottom thereof, but being readily removed in the manner I have shown when the rubber has been drawn to the desired position.

Having thus described my invention, I claim as follows:

1. In a device for pulling rubber tires, a plurality of U-shaped hooks the arms of one side of which are adapted to engage the under side of the tire and the arms of the other side of which pivotally engage with a pulling-bar and means of moving said bar, substantially as described.

2. In a rubber-tire-pulling machine for equipping vehicle-wheels with rubber tires, the combination of a notched bar with U-shaped hooks, one arm of which is adapted to engage said bar at the top thereof and the other arm and portion adjacent thereto adapted to engage the bottom and side of the rubber tire, and means for pulling said notched bar, substantially as described.

3. In a tire-pulling device, the combination of independent U-shaped hooks, a notched bar adapted to support said hooks, one arm of said hooks removably engaging and pivoting in said bar and the other arm engaging the tire and means for pulling said bar and hooks, substantially as specified.

4. In a device for pulling rubber tires the combination with four or more U-shaped hooks to clamp the rubber tire on opposite sides of a bar adapted to engage the upper part of said hooks one arm of the U engaging over said bar and the other arm engaging under the tire substantially as specified and means for pulling said bar to a predetermined position.

5. In a machine for pulling rubber tires the combination of a notched bar connected to said rubber tire, a block with one or more pins and a lever having means to interchangeably pivotally engage any one of said pins, means for connecting said lever to the notched bars.

In testimony whereof I have hereunto set my hand this 13th day of September, A. D. 1899.

ALVARO S. KROTZ.

Witnesses:
CHAS. I. WELCH,
EDMOND J. OGDEN.